(12) United States Patent
Desai et al.

(10) Patent No.: US 8,409,300 B2
(45) Date of Patent: Apr. 2, 2013

(54) DISPERSE AZO DYES

(75) Inventors: Pankaj Desai, Gujarat (IN); Kiyoshi Himeno, Fukuoka (JP); Nikhil Desai, Gujarat (IN)

(73) Assignee: Colourtex Industries Limited (IN)

( * ) Notice: Subject to any disclaimer, the term of this patent is extended or adjusted under 35 U.S.C. 154(b) by 0 days.

(21) Appl. No.: 13/519,005

(22) PCT Filed: Dec. 23, 2010

(86) PCT No.: PCT/IN2010/000850
§ 371 (c)(1),
(2), (4) Date: Jun. 25, 2012

(87) PCT Pub. No.: WO2011/077461
PCT Pub. Date: Jun. 30, 2011

(65) Prior Publication Data
US 2012/0291207 A1    Nov. 22, 2012

(30) Foreign Application Priority Data
Dec. 23, 2009 (IN) .................. 2979/MUM/2009

(51) Int. Cl.
*D06P 5/17* (2006.01)

(52) U.S. Cl. .......... 8/464; 8/637.1; 8/639; 8/640; 8/641; 8/642

(58) Field of Classification Search ........... 8/464, 637.1, 8/639, 640, 641, 642
See application file for complete search history.

(56) References Cited

U.S. PATENT DOCUMENTS
3,406,165 A    10/1968    Kruckenberg

FOREIGN PATENT DOCUMENTS
| EP | 0563975 A1 | 10/1993 |
| GB | 909843 | * 11/1962 |
| GB | 909843 A | 11/1962 |
| WO | 2008/074719 A1 | 6/2008 |

OTHER PUBLICATIONS

STIC Search Report dated Oct. 12, 2012.*
International Search Report and Written Opinion for International Application No. PCT/IN2010/000850, mailed Jul. 6, 2011.

* cited by examiner

*Primary Examiner* — Eisa Elhilo
(74) *Attorney, Agent, or Firm* — Cantor Colburn

(57) ABSTRACT

Novel disperse azo dyes of formula (I), and processes for preparation thereof. These dyes possess superior washing fastness, sublimation fastness and light fastness.

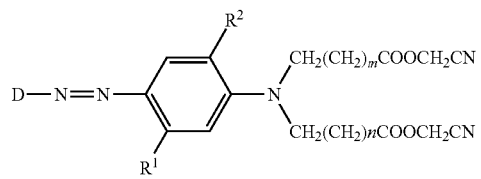

(1)

7 Claims, No Drawings

DISPERSE AZO DYES

CROSS REFERENCE TO RELATED APPLICATIONS

This is a U.S. national stage of application No. PCT/IN2010/000850, filed on 23 Dec. 2010. Priority under 35 U.S.C. §119(a) and 35 U.S.C. §365(b) is claimed from Indian Application No. 2979/MUM/2009, filed 23 Dec. 2009, the disclosure of which are also incorporated herein by reference.

FIELD OF THE INVENTION

The present invention relates to novel disperse dyes and its use thereof.

BACKGROUND OF THE INVENTION

Traditionally, disperse dyes are used for dyeing synthetic fibers and its blend with other fibers such as cellulose, polyurethane, nylon and wool by usual exhaust dyeing, continuous dyeing and printing techniques.

Recently with changing trends, fashion and market requirement consumption of blended fabrics is significantly increased. These new fabrics are made out of micro size fiber using fine denier polyester fiber or blending fiber with polyurethane, nylon and wool. The fastness properties of these new colored fabrics become worse in light fastness and sublimation fastness, particularly washing fastness when dyed or printed with conventional disperse dyes. The fastness properties worsen due to thinning of dyed fiber by using fine denier polyester fiber or blending fiber with polyurethane, nylon and wool. The excellent dyestuff to endure this use is desired in this dyeing and printing field.

IN190551 and its divisional patents IN197577 and IN196765 disclose monoazo dyes containing fluorosulphonyl group. The aforesaid Indian Patents disclose process for colouring synthetic textile material or fiber blend.

The patent application 2162/KOLNP/2009 which is published as WO 2008/074719 discloses disperse dye mixture comprising (a) two or more disperse dyestuffs of the formula (I). GB 909843 also discloses novel azodyes. However, the dyes disclosed in GB 909843 are unable to provide solutions to the highly sophisticated micro fiber blends.

Thus the prior art discloses azo dye compounds and process for preparation, however does not impart excellent fastness properties particularly Light Fastness and Washing Fastness properties.

OBJECTS OF THE INVENTION

It is an object of the present invention to provide yellow, red and blue disperse azo dyes.

It is another object of the present invention to provide process for coloration of synthetic textile materials.

It is a further object of the present invention to provide disperse azo dyes with excellent Light Fastness and Washing Fastness properties on the polyester fiber

SUMMARY OF THE INVENTION

According to one aspect of the present invention there is provided disperse dyes of Formula 1.

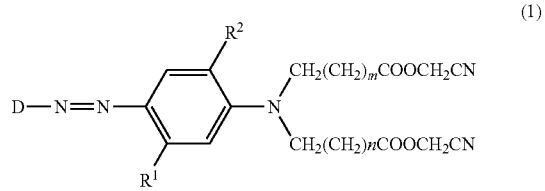

(1)

wherein,
$R^1$ is hydrogen, methyl, hydroxyl or $NHR^3$;
$R^2$ is hydrogen, chloro or methoxy;
wherein,
D is a group of the formula (2a)

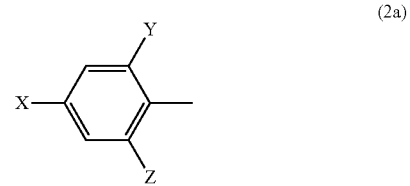

(2a)

wherein,
X, Y and Z are, independently, hydrogen, methyl, halogen, cyano or nitro;
Or a group of the formula (2b),

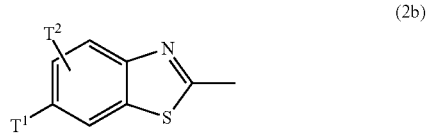

(2b)

wherein,
$T^1$ is independently hydrogen, halogen, nitro, $-SO_2CH_3$ or $-SCN$; and
$T^2$ is hydrogen or halogen;
Or a group of the formula (2c),

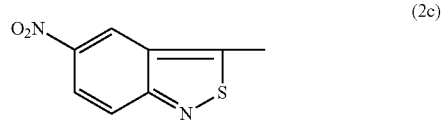

(2c)

Or a group of the formula (2d),

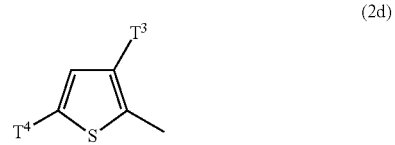

(2d)

wherein,
$T^3$ and $T^4$ are independently nitro, acetyl, $COOR^4$ or cyano;
$R^3$ is —$COCH_3$, —$COC_2H_5$, —$SO_2CH_3$ or $SO_2C_2H_5$;
$R^4$ is $C_1$ to $C_4$ unsubstituted alkyl;
n and m are independently 0, 1 or 2.

According to yet another aspect of the present invention there is provided processes for preparation of disperse azo dyes of Formula (1) having excellent washing fastness and light fastness on the polyester fiber.

DETAILED DESCRIPTION OF THE PRESENT INVENTION

The present invention provides new disperse dyes of formula (1) with excellent washing fastness and light fastness.

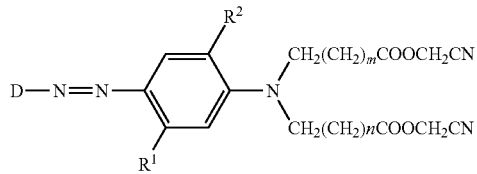

(1)

wherein,
$R^1$ is hydrogen, methyl, hydroxyl or $NHR^3$;
$R^2$ is hydrogen, chloro or methoxy;
wherein,
D is a group of the formula (2a)

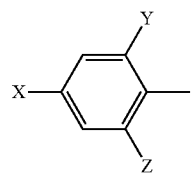

(2a)

wherein,
X, Y and Z are, independently, hydrogen, methyl, halogen, cyano or nitro;

Or a group of the formula (2b),

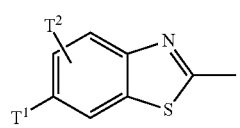

(2b)

wherein,
$T^1$ is independently hydrogen, halogen, nitro, —$SO_2CH_3$ or —SCN; and
$T^2$ is hydrogen or halogen;
Or a group of the formula (2c),

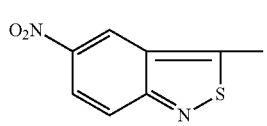

(2c)

Or a group of the formula (2d), (2d)

wherein,
$T^3$ and $T^4$ are independently nitro, acetyl, $COOR^4$ or cyano;
$R^3$ is —$COCH_3$, —$COC_2H_5$, —$SO_2CH_3$ or $SO_2C_2H_5$;
$R^4$ is $C_1$ to $C_4$ unsubstituted alkyl;
n and m are independently 0, 1 or 2.

The present invention further describes processes for syntheses of novel disperse dyes, the preparation of the dye composition and methods for applying these dyes to fibers.

Disperse Azo Dyes are generally prepared by diazotization of primary aromatic amine and subsequently couple with suitable coupling component.

Under appropriate conditions, primary aromatic or heteroaromatic amine can be successfully diazotized and coupled with specially developed coupling component to get novel disperse dyes of formula (1) respectively. These new disperse dyes possesses excellent washing and light fastness properties.

The present invention further provides a composition comprising a disperse dye of the present invention and additionally at least on further ingredient conventionally used in colouring application such as a disperse agent and optionally a surfactant or wetting agent. The dye composition typically comprises from 10% to 65%, preferably 20% to 50% by weight of the total dye as single component or mixture in solid medium.

Typical examples of dispersing agent are lignosulphonates, naphthalene sulfonic acid/formaldehyde condensates and phenol/cresol/sulphanilic acid/formaldehyde condensates. Typical examples of wetting agent are alkyl aryl ethoxylates which may be sulphonated or phosphate and typical examples of other ingredients which may be present are inorganic salts, de-foamer such as mineral oil or nonanol, organic liquids and buffers. Disperse agents may be present at from 80% to 400% on the weight of the dye mixtures. Wetting agents may be used at from 0.1% to 20% on the weight of the dye mixtures.

The disperse dye or mixtures of disperse dyes of the present invention is milled with suitable dispersing agent using glass beads or sand in an aqueous medium. The compositions may have further additions of dispersing agents, fillers and other surfactants and may be dried, by a technique such as spray drying, to give a solid composition comprising from 15% to 65% by weight of dyestuff.

In case of dyeing with fiber materials, the dyestuffs are milled in water with dispersing agent in usual method and the finished dyes are used for dyeing or printing in the liquid form or the powder form after spray drying of the liquid. The each finished dye is used for dyeing and printing in single or mixtures of two or the more of the present invention dyes.

In case of exhaust dyeing, the polyester fiber, the conjugated fiber and the blend fiber is dyed in excellent fastness by high temperature dyeing, carrier dyeing and continuous dyeing. The dyestuff of formula (1) may be used individually or as a mixture of derivatives of formula (1) for dyeing and printing.

In the case of printing, the polyester fiber, the textile materials are processed in excellent fastness by direct printing or discharge printing.

Embodiment of the present invention will be described in more detail with reference to the following examples, in which parts are by weight unless otherwise stated. The present invention is concretely explained as follows, but the present invention is not limited in these examples.

The preparation of Dyestuff of formula 1 comprises the following steps:

a) Synthesis of coupling component;
b) Diazotization of aromatic amine;
c) Coupling of diazonium salt with suitable coupling component;
d) Milling with suitable disperse agents, fillers and optionally wetting agents or surfactants.
e) Use it as liquid or spray dry to get final powder sample.

Example-1

Structural formula (3)

The example 1 of structural formula (3) is synthesized in the following method.

Acrylic acid 20.0 g is added into the mixture of DMF (N,N-dimethyformamide) 40.0 g and 3-amino acetanilide 15 g and heated to 80° C. and maintain under continues stirring for 2 hours. After completion of reaction, Chloroacetonitrile (cyanomethylchloride) 19.4 g are added into the reaction mass and heated to 80° C. and maintain under continues stirring for 2 hours. On completion of reaction this reaction mass which contains 35 g of this coupler is used for next coupling reaction.

30 ml of 40% nitrosylsulfuric acid is added to the mixture of 19.4 g 2,4-dinitro aniline and 50 ml sulfuric acid at 0-5° C. and stirred for 2 hr below 5° C. After 2 hrs this diazonium salt solution is added to the pre-charged mixture of Ice, water and 35 g of Coupler, N, N-dicyanomethoxycarbonylethyl-3-acetoamideaniline at 0-5° C. The reaction mass is stirred for 1 hr below 5° C. and filtered. The crystal solid is then washed with chilled water to get 90% yield of the Dyestuff of formula (3). The $\lambda$max (in acetone) of the dyestuffs of formula (3) is 536 nm.

2.0 g of the obtained wet press cake is milled with 2.0 g of naphthalenesulfonic acid-formaldehyde condensate and 50 g of water and 500 g of glass beads (average side is 0.8 mm of diameter.) for 24 hr and after milling, the mass is filtered to separate glass beads.

20 g of the obtained finished liquid is added in 100 ml of water and pH adjusted to 4 with acetic acid. 10 g piece of polyester is added into the dye bath for exhaust dyeing.

The dyeing bath is heated to 135☐ and kept for 40 minutes. After proper rinsing, washing and drying, the dyed material gives deep Rubine shade with excellent washing fastness, light fastness and sublimation fastness.

Fastness properties of the dyed fabrics are evaluated by following test method.

Washing Fastness as per Test Method AATCC 61 2A, Light Fastness as per Test Method ISO 105 B02 and Sublimation Test at 180 deg for 30 sec and at 210 deg for 30 sec.

Example 2

The dyestuffs of the formula (4) are synthesized using same methods described in Example-1 to get following dyes described in table:

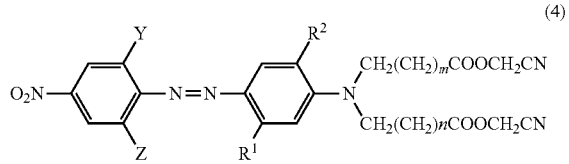

| Example | Y | Z | $R^1$ | $R^2$ | $R^3$ | m | n | $\lambda_{max}$(nm) |
|---|---|---|---|---|---|---|---|---|
| 2-1 | $NO_2$ | H | $NHR^3$ | H | $COCH_3$ | 0 | 0 | 536 |
| 2-2 | $NO_2$ | H | $NHR^3$ | H | $COCH_3$ | 1 | 1 | 538 |
| 2-3 | $NO_2$ | Cl | $NHR^3$ | H | $COCH_3$ | 0 | 0 | 546 |
| 2-4 | Cl | Cl | H | H | — | 1 | 1 | 430 |
| 2-5 | Cl | Br | H | H | — | 1 | 1 | 429 |
| 2-6 | CN | H | $CH_3$ | H | — | 1 | 1 | 523 |
| 2-7 | CN | H | $NHR^3$ | H | $COCH_3$ | 0 | 0 | 526 |
| 2-8 | Cl | H | $NHR^3$ | H | $COCH_3$ | 1 | 1 | 524 |
| 2-9 | $NO_2$ | H | $NHR^3$ | $OCH_3$ | $COCH_3$ | 1 | 1 | 560 |
| 2-10 | $NO_2$ | Br | $NHR^3$ | $OCH_3$ | $COCH_3$ | 1 | 1 | 585 |
| 2-11 | CN | Br | $NHR^3$ | $OCH_3$ | $COCH_3$ | 1 | 1 | 607 |
| 2-12 | Cl | Br | H | H | — | 1 | 2 | 433 |

These dyestuffs show the excellent washing fastness, light fastness and sublimation fastness.

Example-3

The dyestuffs of the formula (2) are synthesized using same methods described in Example-1 to get following dyes described in table:

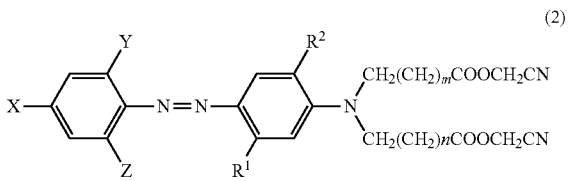

| Example | X | Y | Z | $R^1$ | $R^2$ | $R^3$ | m | n | $\lambda_{max}$(nm) |
|---|---|---|---|---|---|---|---|---|---|
| 3-1 | $CH_3$ | CN | CN | $NHR^3$ | H | $COCH_3$ | 1 | 1 | 522 |
| 3-2 | Cl | CN | CN | $NHR^3$ | H | $SO_2CH_3$ | 1 | 1 | 525 |

| | | | | | | | | |
|---|---|---|---|---|---|---|---|---|
| 3-3 | Cl | NO$_2$ | H | CH$_3$ | H | — | 1 | 1 | 440 |
| 3-4 | Cl | CN | CN | OH | H | — | 1 | 1 | 510 |

These dyestuffs show the excellent washing fastness, light fastness and sublimation fastness.

Example 4

The dyestuffs of the formula (1) are synthesized using same methods described in example-1 to get following dyes described in table:

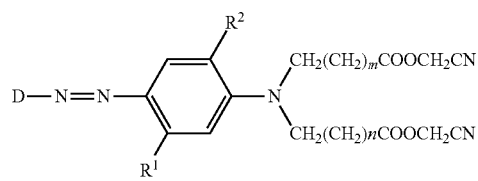

(1)

| Example | D | R$^1$ | R$^2$ | R$^3$ | m | n | $\lambda_{max}$(nm) |
|---|---|---|---|---|---|---|---|
| 4-1 | 5:6-dichloroBenzothiazole | H | H | — | 1 | 1 | 515 |
| 4-2 | 6-nitrobenzothiazole | H | H | — | 1 | 1 | 537 |
| 4-3 | 6-chlorobenzothiazole | NHR$^3$ | H | COCH$_3$ | 1 | 1 | 525 |
| 4-4 | 3,5-dinitro Thiophene | CH$_3$ | H | — | 1 | 1 | 630 |
| 4-5 | 6-nitrobenzoisothiazole | NHR$^3$ | H | COCH$_3$ | 1 | 1 | 605. |

These dyestuffs show the excellent washing fastness, light fastness and sublimation fastness.

Comparative Example-1

The following dyes written as Dye 1-5 and Dye 1-38 each in the Table-1 of WO2008/074719 is compared with dyes written as Dye Example 2-1 in this patent in washing fastness and sublimation fastness as follows.

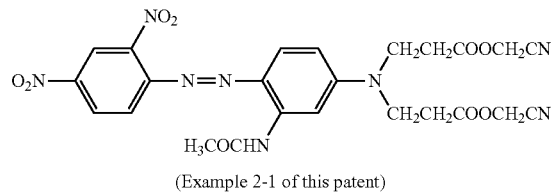

(Example 2-1 of this patent)

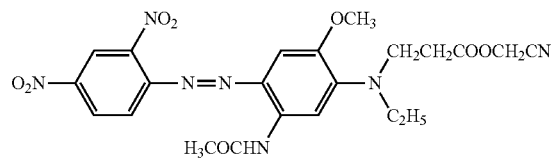

(Dye 1-5 in table 1 of WO2008/074719)

| Dye | Washing fastness (WF) | Sublimation fastness (SF) | Light fastness (LF) |
|---|---|---|---|
| Example 2-1 of this patent | 4 class | 5 class | 4-5 class |
| Comparative Dye 1-5 in Table-1 of W2008/074719 | 2-3 class | 3-4 class | 3-4 class |

Washing Fastness as per Test Method AATCC 61 2A, Light Fastness as per Test Method ISO 105 B02 and Sublimation Test at 180 deg for 30 sec and at 210 deg for 30 sec.

Dye of Example 2-1 of this patent and comparative Dye 1-5 are very similar chemicals only except difference between ethyl group and C$_2$H$_4$COOCH$_2$CN in amino radical and Methoxy group is not there in Example 2-1 but the quality differences are very big especially in washing fastness, also in sublimation fastness and light fastness. This comparative example provides confirmation to the logical approach to introduce two C$_2$H$_4$COOCH$_2$CN substituents to improve washing fastness properties instead of only one in the WO2008/074719. Introduction of two C$_2$H$_4$COOCH$_2$CN substituents gives more excellent washing fastness and also results in the improvement in sublimation fastness and light fastness.

Comparative Example 2

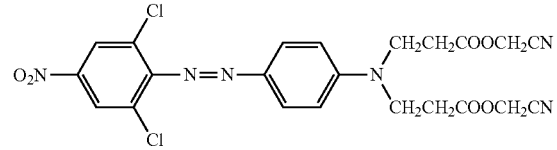

(Example 2-4 of this patent)

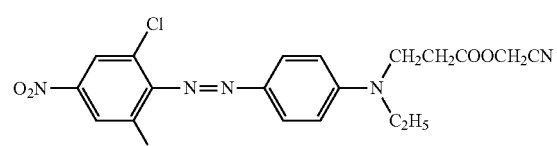

(Dye 1-38 in table 1 of WO2008/074719)

| Dye | Washing fastness (WF) AATCC method (Ny) | Sublimation fastness (SF) | Light fastness (LF) |
|---|---|---|---|
| Example 2-4 of this patent | 5 class | 5 class | 6 class |
| Comparative dye 1-38 in table 1of W2008/074719 | 2-3 class | 3-4 class | 5 class |

Dye of example 2-4 of this patent and comparative dye 1-38 are very similar chemicals only except difference between ethyl group and C$_2$H$_4$COOCH$_2$CN in amino radical. But the quality differences are very big especially in washing fastness, also in sublimation fastness and light fastness. This comparative example further provide confirmation to the logical approach adopted to get dyestuff with improve washing fastness properties by introducing two C$_2$H$_4$COOCH$_2$CN substituent instead of one C$_2$H$_4$COOCH$_2$CN in the WO2008/074719. In addition to the improvement in washing fastness introduction of two C$_2$H$_4$COOCH$_2$CN substituents gives excellent results with the improvement in sublimation fastness and light fastness.

The invention claimed is:

1. Novel Disperse azo dyes of formula (1)

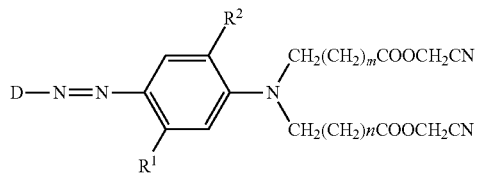
(1)

wherein,
R$^1$ is hydrogen, methyl, hydroxyl or NHR$^3$;
R$^3$ is —COCH$_3$, —COC$_2$H$_5$, —SO$_2$CH$_3$ or —SO$_2$C$_2$H$_5$
R$^2$ is hydrogen, chloro or methoxy;
wherein,
D is a group of the formula (2a)

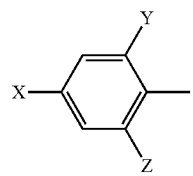
(2a)

wherein,
X, Y and Z are, independently, hydrogen, methyl, halogen, cyano or nitro; with the proviso:
only when both Y and Z are simultaneously selected from methyl, halogen, cyano or nitro, then both R1 and R2 are simultaneously hydrogen;
Or a group of the formula (2b),

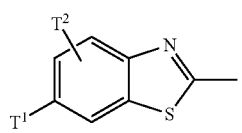
(2b)

wherein,
T$^1$ is independently halogen or nitro,
T$^2$ is hydrogen or halogen;
with the proviso:
When T$^1$ is Nitro, T$^2$ is not hydrogen;
Or a group of the formula (2c),

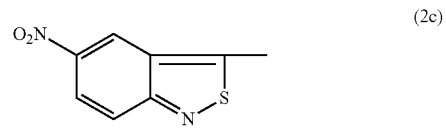
(2c)

Or a group of the formula (2d),

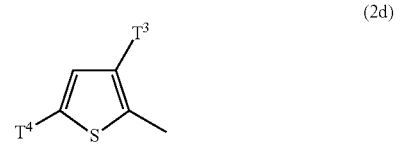
(2d)

wherein,
T$^3$ and T$^4$ are independently nitro, acetyl, COOR$^4$ or cyano;
R$^4$ is C$_1$ to C$_4$ unsubstituted alkyl;
n and m are independently 0, 1 or 2.

2. Novel disperse azo dyes according to claim 1 in which the compound of formula (1) is of formula (2)

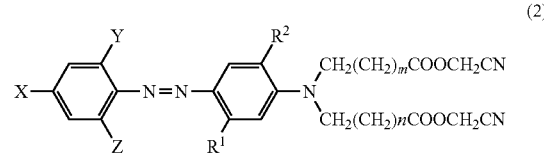
(2)

| X | Y | Z | R$^1$ | R$^2$ | R$^3$ | m | n |
|---|---|---|---|---|---|---|---|
| CH$_3$ | CN | CN | NHR$^3$ | H | COCH$_3$ | 1 | 1 |
| Cl | CN | CN | NHR$^3$ | H | SO$_2$CH$_3$ | 1 | 1 |
| Cl | NO$_2$ | H | CH$_3$ | H | — | 1 | 1 |
| Cl | CN | CN | OH | H | — | 1 | 1. |

3. Novel disperse azo dyes according to claim 1 in which the compound of formula (1) is of formula (4):

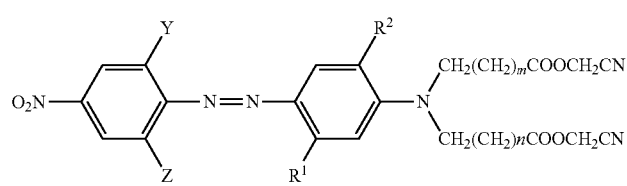
(4)

Wherein,

| Y | Z | R$^1$ | R$^2$ | R$^3$ | m | n |
|---|---|---|---|---|---|---|
| NO$_2$ | H | NHR$^3$ | H | COCH$_3$ | 0 | 0 |
| NO$_2$ | H | NHR$^3$ | H | COCH$_3$ | 1 | 1 |
| NO$_2$ | Cl | NHR$^3$ | H | COCH$_3$ | 0 | 0 |
| Cl | Cl | H | H | — | 1 | 1 |
| Cl | Br | H | H | — | 1 | 1 |
| CN | H | CH$_3$ | H | — | 1 | 1 |
| CN | H | NHR$^3$ | H | COCH$_3$ | 0 | 0 |

-continued

| | | | | | | |
|---|---|---|---|---|---|---|
| Cl | H | NHR³ | H | COCH₃ | 1 | 1 |
| NO₂ | H | NHR³ | OCH₃ | COCH₃ | 1 | 1 |
| NO₂ | Br | NHR³ | OCH₃ | COCH₃ | 1 | 1 |
| CN | Br | NHR³ | OCH₃ | COCH₃ | 1 | 1. |

4. Novel disperse azo dyes according to claim 1 in which the compound of formula (1) is:

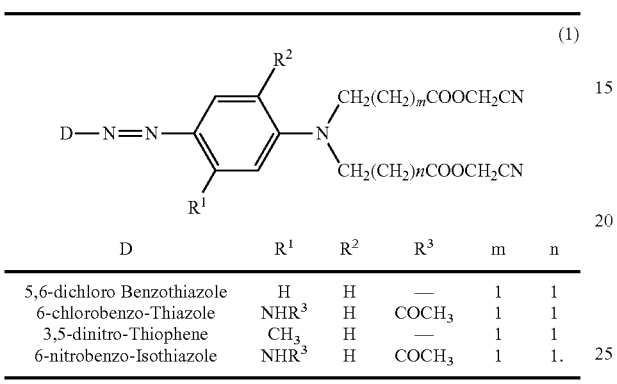

(1)

| D | R¹ | R² | R³ | m | n |
|---|---|---|---|---|---|
| 5,6-dichloro Benzothiazole | H | H | — | 1 | 1 |
| 6-chlorobenzo-Thiazole | NHR³ | H | COCH₃ | 1 | 1 |
| 3,5-dinitro-Thiophene | CH₃ | H | — | 1 | 1 |
| 6-nitrobenzo-Isothiazole | NHR³ | H | COCH₃ | 1 | 1. |

5. Novel disperse azo dyes according to claim 1 designated as formula (3):

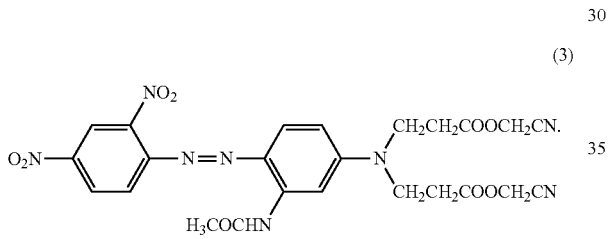

(3)

6. Novel disperse azo dyes to claim 1 designated as formula (5):

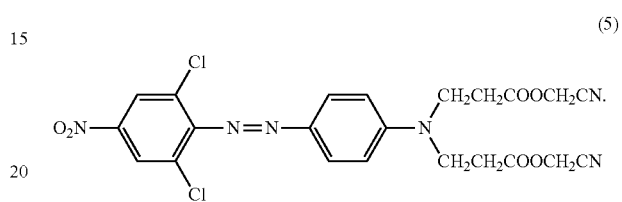

(5)

7. Novel disperse azo dyes according to claim 1 designated as formula (6):

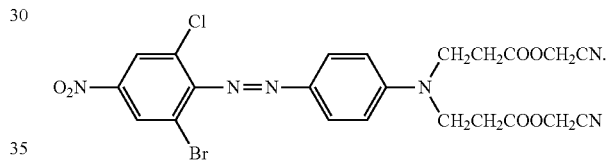

(6)

* * * * *